Figure 1:
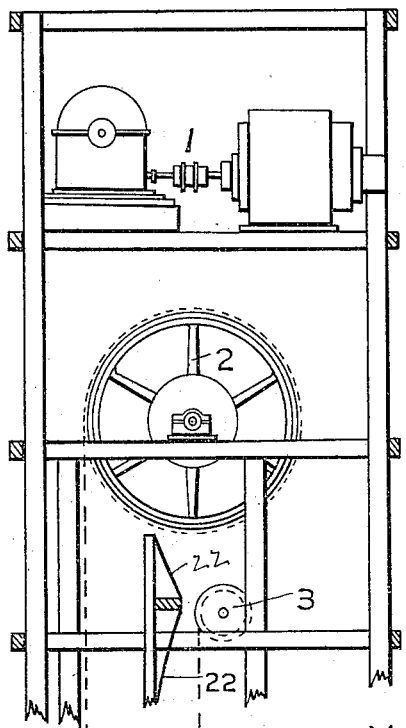

No. 839,467.  
PATENTED DEC. 25, 1906.

W. H. GERMAN.  
AUTOMATIC DISCHARGING ELEVATOR CONVEYER FOR STORE AND OFFICE SERVICE.  
APPLICATION FILED OCT. 13, 1905.

8 SHEETS—SHEET 1.

Witnesses  
Inventor,  
Walter Hussey German,  
by his Attorney.

No. 839,467. PATENTED DEC. 25, 1906.
W. H. GERMAN.
AUTOMATIC DISCHARGING ELEVATOR CONVEYER FOR STORE AND OFFICE SERVICE.
APPLICATION FILED OCT. 13, 1905.

8 SHEETS—SHEET 2.

Witnesses,
M. G. Crawford
W. H. Humphrey

Inventor,
Walter Hussey German,
by A. Parker Smith
his Attorney

No. 839,467. PATENTED DEC. 25, 1906.
W. H. GERMAN.
AUTOMATIC DISCHARGING ELEVATOR CONVEYER FOR STORE AND OFFICE SERVICE.
APPLICATION FILED OCT. 13, 1905.

8 SHEETS—SHEET 3.

Inventor,
Witnesses, Walter Hussey German,

No. 839,467.

W. H. GERMAN.

PATENTED DEC. 25, 1906.

AUTOMATIC DISCHARGING ELEVATOR CONVEYER FOR STORE AND OFFICE SERVICE.

APPLICATION FILED OCT. 13, 1905.

8 SHEETS—SHEET 4.

No. 839,467. PATENTED DEC. 25, 1906.
W. H. GERMAN.
AUTOMATIC DISCHARGING ELEVATOR CONVEYER FOR STORE AND OFFICE SERVICE.
APPLICATION FILED OCT. 13, 1905.

8 SHEETS—SHEET 5.

Witnesses,

Inventor
Walter Hussey German
by
his Attorney.

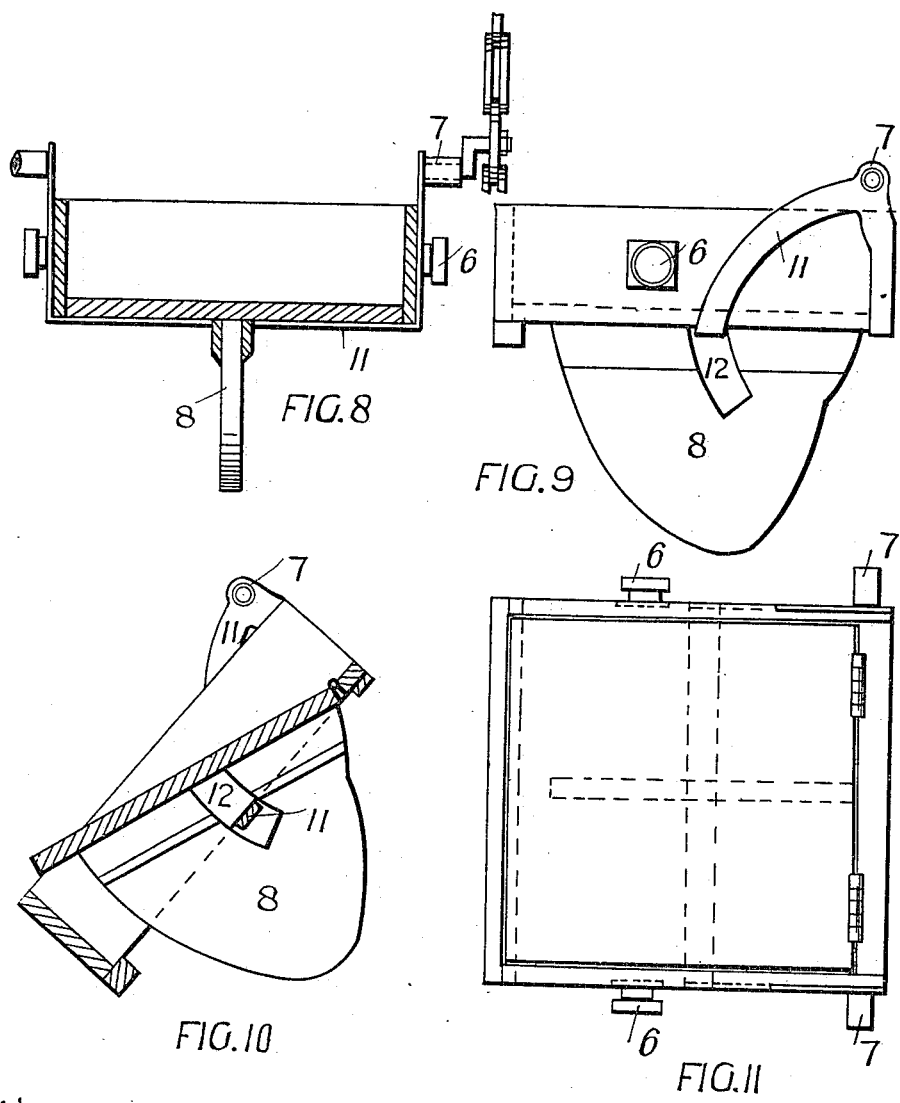

No. 839,467. PATENTED DEC. 25, 1906.
W. H. GERMAN.
AUTOMATIC DISCHARGING ELEVATOR CONVEYER FOR STORE AND OFFICE SERVICE.
APPLICATION FILED OCT. 13, 1905.

8 SHEETS—SHEET 7.

Witnesses:
M. G. Crawford
W. H. Pumphrey

Inventor,
Walter Hussey German,
by A. Parker Smith
his Attorney

No. 839,467. PATENTED DEC. 25, 1906.
W. H. GERMAN.
AUTOMATIC DISCHARGING ELEVATOR CONVEYER FOR STORE AND OFFICE SERVICE.
APPLICATION FILED OCT. 13, 1905.

8 SHEETS—SHEET 8.

UNITED STATES PATENT OFFICE.

WALTER HUSSEY GERMAN, OF MANLY, NEAR SYDNEY, NEW SOUTH WALES, AUSTRALIA.

AUTOMATIC DISCHARGING ELEVATOR-CONVEYER FOR STORE AND OFFICE SERVICE.

No. 839,467.   Specification of Letters Patent.   Patented Dec. 25, 1906.

Application filed October 13, 1905. Serial No. 282,670.

*To all whom it may concern:*

Be it known that I, WALTER HUSSEY GERMAN, a subject of the King of Great Britain and Ireland, residing at "Ashbourne," Wood street, Manly, near Sydney, in the State of New South Wales, Commonwealth of Australia, have invented new and useful Improvements in Automatic Discharging Elevator-Conveyers for Store and Office Service, of which the following is a specification.

My invention relates to elevator-conveyers for store and office service.

It has particular reference to the carriers and the mechanism for discharging the same.

In my apparatus an endless-belt conveyer provided with carriers works continuously in a vertical casing which extends through two or more floors of a warehouse, store, or office and conveys letters, packages, or goods from any floor to any other floor therein.

Within extreme limits a conveyer constructed according to the present invention may be adapted to handle either very small or heavy parcels, depending upon the proportions of its parts. The carriers consist of trays which are adapted to discharge when their end plates are thrown out or a false bottom plate is tipped up. These trays are suspended on the chain belt so as to hang angularly, but so that parcels or goods may rest securely in them. The movement of the bottom or end plates is effected by contact of an attachment thereon with cam-blocks set up at appropriate places on the housing in which the chain belt runs. Different trays or boxes are adapted to be discharged at different predetermined levels by setting cam-blocks to make contact with the tappets on said trays or boxes when and only when same are passing the points at which it is required to discharge them, respectively. At each discharging-level an aperture is made in the housing and a receiving-basket provided with a chute which is set to receive the packets or parcels discharged through the aperture. The load of packets or parcels is placed in the trays or baskets as the same pass any aperture in the casing without stopping the belt, and the load is then carried round the circuit until it reaches the floor at which the particular tray in which it is contained is destined to unload itself. At this point the tipping-tappet is acted upon by the cam and the load is discharged through the aperture into the receiving-basket, onto the floor, or onto a traveling band.

The carrying-tray which I prefer to use has a bottom plate adapted to lift up at the lower edge about hinges which are placed at the upper edge. The tray is suspended between a pair of continuous chain belts, and the sides of the tray are provided with guide-lugs, which run in channeled rail-guides set up in the housing. Notwithstanding any load within extreme limits which may be placed in them these trays will under control of their hanging and guiding supports maintain a more or less fixed angle, and there will be no tendency to spill or discharge the load until the bottom plate is raised up, so that its front edge will come above the level of the front end of the tray. The angle at which the trays lie at work is greater than the sliding angle, even when the bottom plate is raised to discharge the load, so that the same is retained between the load and delivery stations by resting on the bottom plate of the tray.

When the bottom plate against the end plate is swung up about the hinges, so as to clear the top edge of the end plate of the tray, (but always so as not to pass the angle of rest,) the package or parcel contained in the tray is free to slide out, and it slides out through the aperture which is provided in the housing. This tipping up of the bottom plate of the tray is effected by means of a tappet-piece thereon which is set to coact with the cam-block, which is mounted on the standing part of the housing. When the tappet meets this cam-block, it presses against the tray-bottom plate, lifting it sufficiently to free the load, and thereafter allowing it to fall back gradually into its former position before reaching the next level, so that it will be set to receive new loading.

In an alternative construction a false bottom plate is attached to the end plate of the tray, which latter is mounted upon the main part of the tray by hinges, and a roller-tappet is provided for the purpose of working against suitably-positioned trippers to tip down the end plate and throw up the false bottom plate of the tray to spill out the load through the aperture just below which the tripper is fixed. In this construction a dash-pot arrangement is used to insure the slow return of the displaced parts to their normal position, so as to avoid noise.

When my conveyer is fitted in a building having a considerable number of floors between which there is much intercommunication required, the carrying boxes or trays may be set up on the chain belt a few feet apart, and in this case there will be a very considerable number of such boxes or trays. A due proportion of them is assigned to each floor, according to the proportion of traffic thereto, and the trays are each suitably marked to indicate the floor at which they are designed to unload themselves. For instance, a certain number of trays might be marked "office-floor," a certain other number "packing-floor," certain others "delivery-floor," and so on. Then, for instance, when a parcel is required to be sent from the delivery-floor to the office-floor the parcel is dropped into one of the trays marked "office-floor" as the same is passing the aperture in the housing at the delivery-floor, and the load so placed in the tray will be carried by the same until it meets the cam positioned at the office-floor, which coacts with its tappet and unloads it there.

It will be found convenient to provide an electric-bell system, whereby the clerk or warehouseman rings up that floor to which he has just directed load to warn the attendants there that a parcel is about to be delivered by the conveyer; but the bell system is in no way essential to the operation of the conveyer itself.

Figure 2:
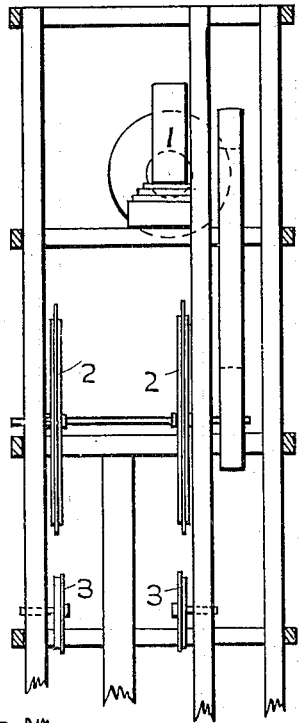
Figure 3:
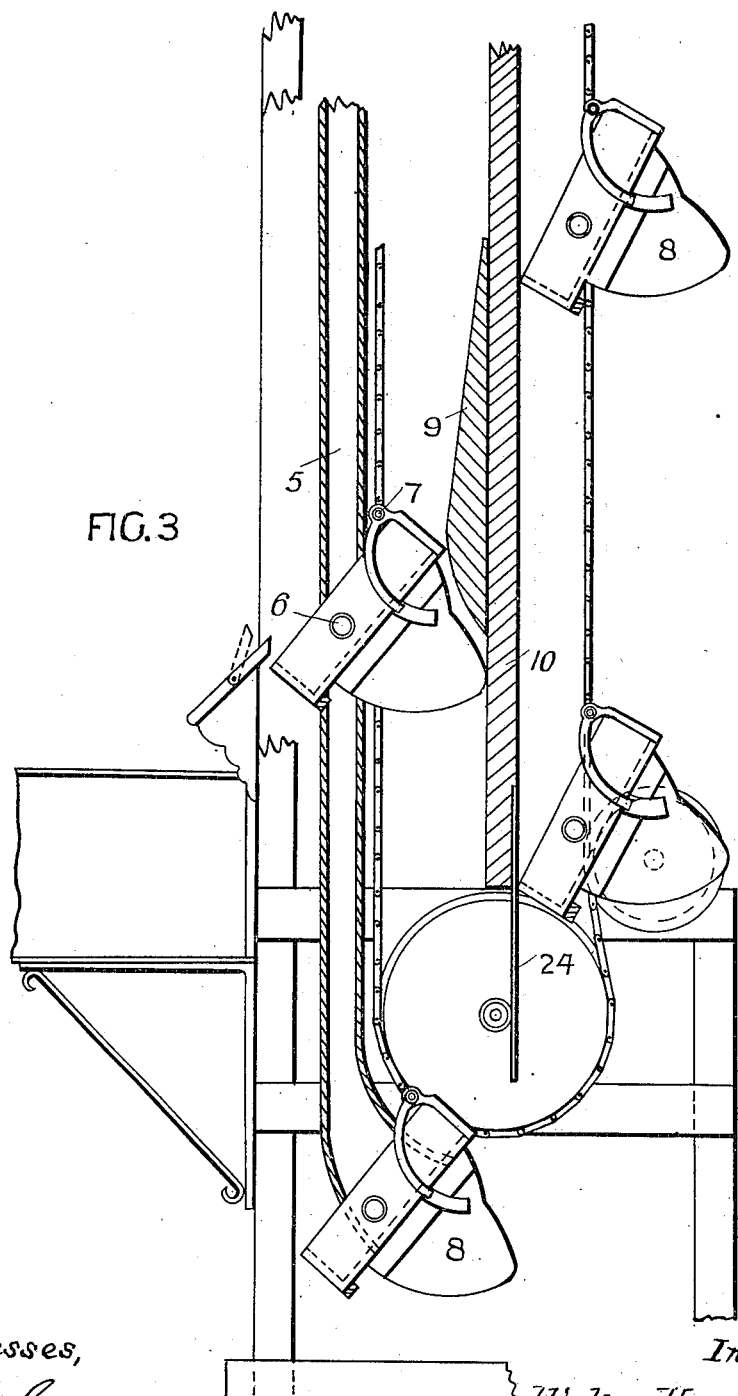
Figure 4:
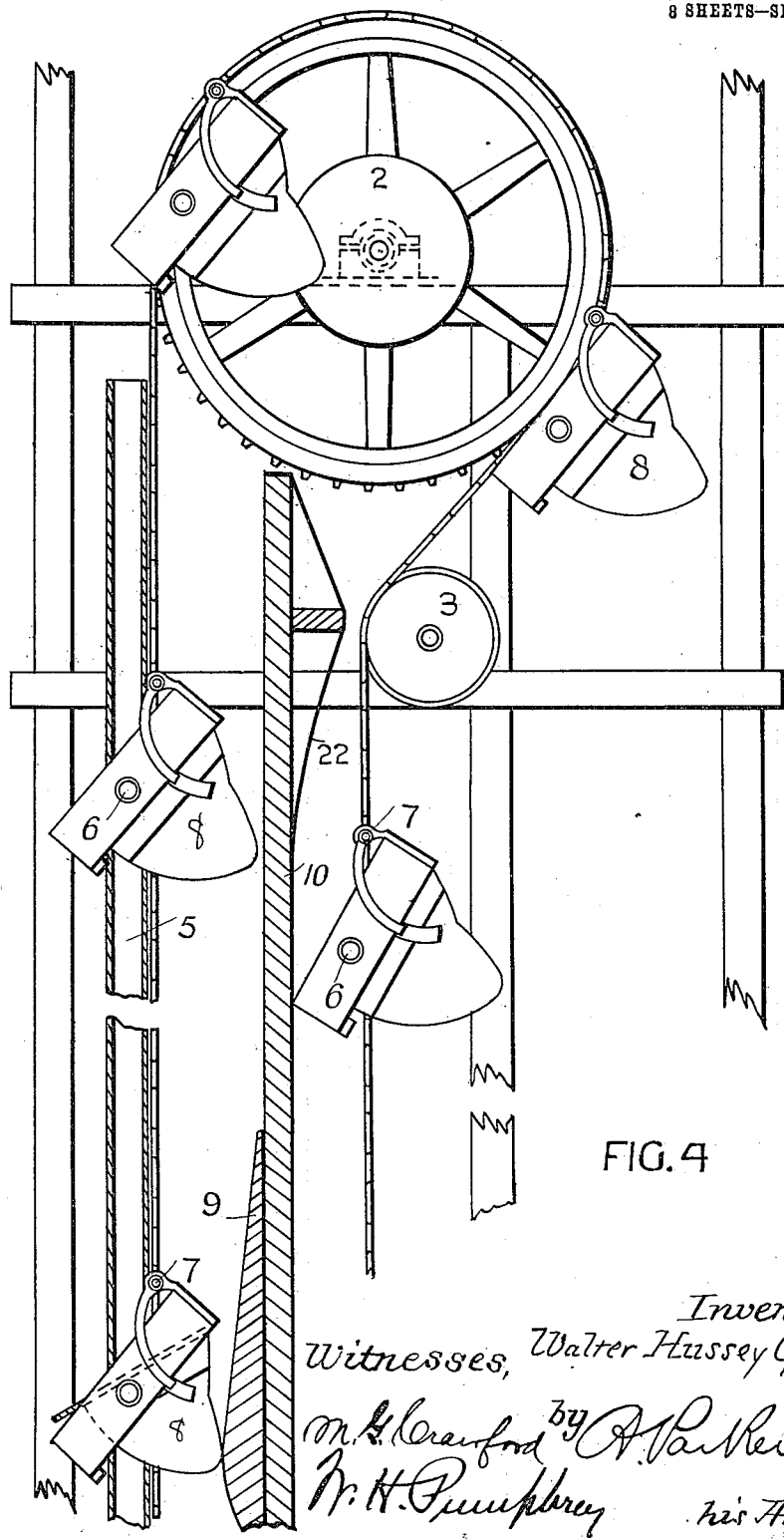
Figures 5, 6:
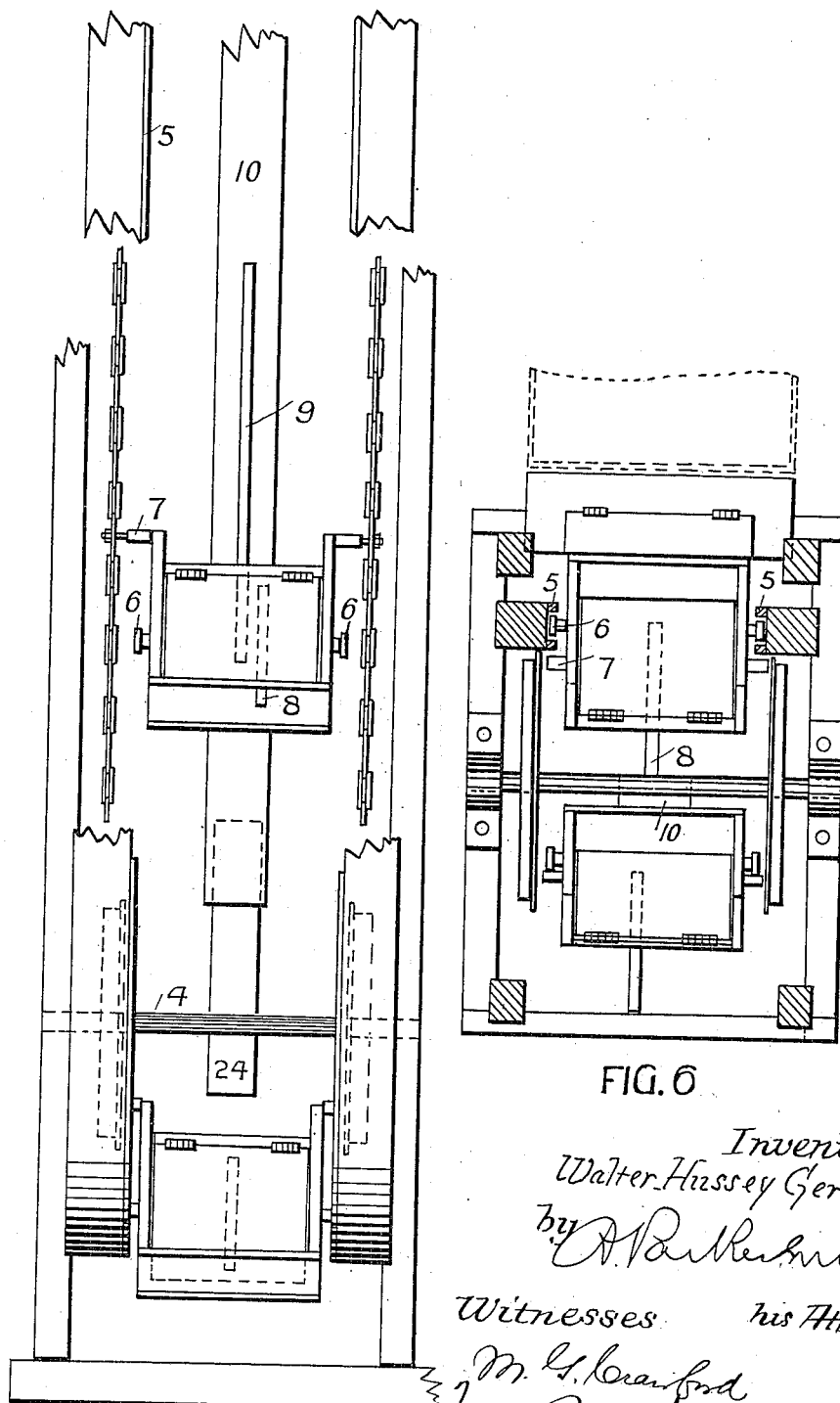
Figure 7:
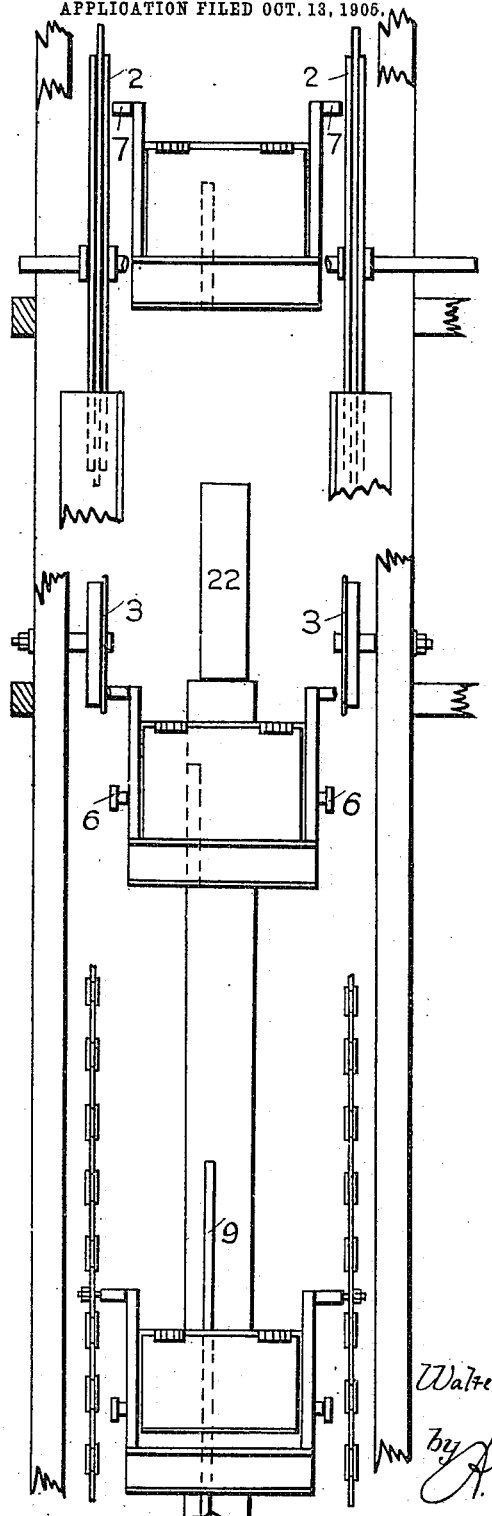
Figure 12:
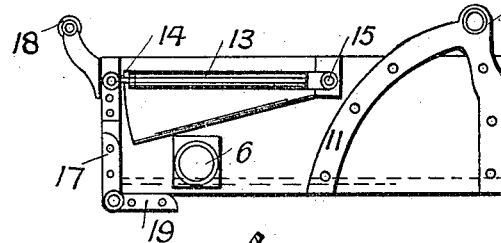
Figure 13:
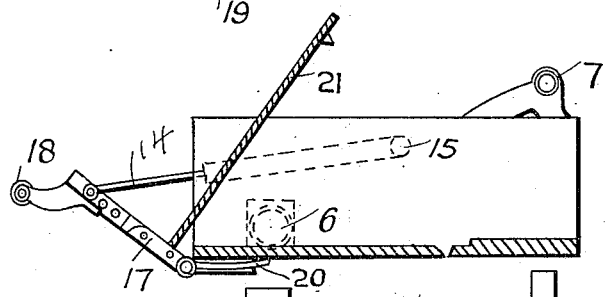
Figure 14:
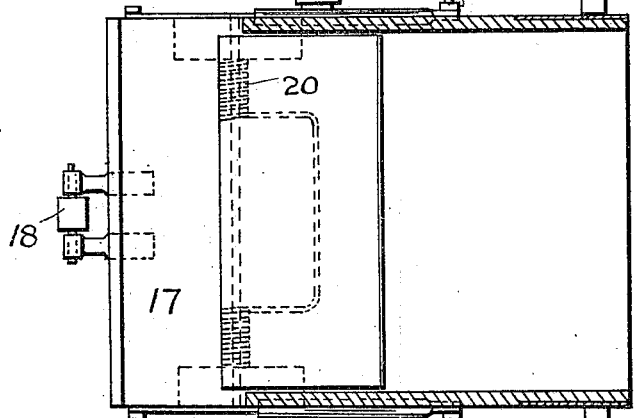
Figure 15:
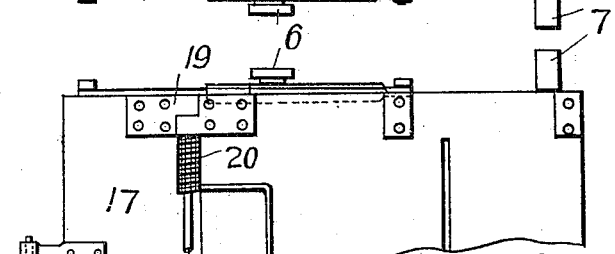
Figure 16:
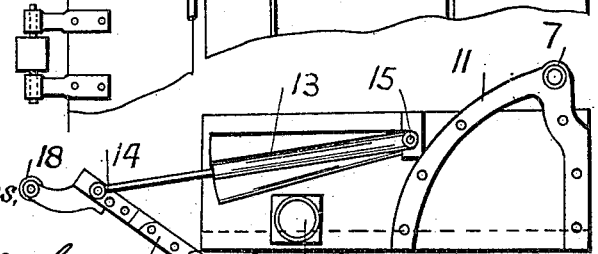
Figure 17:
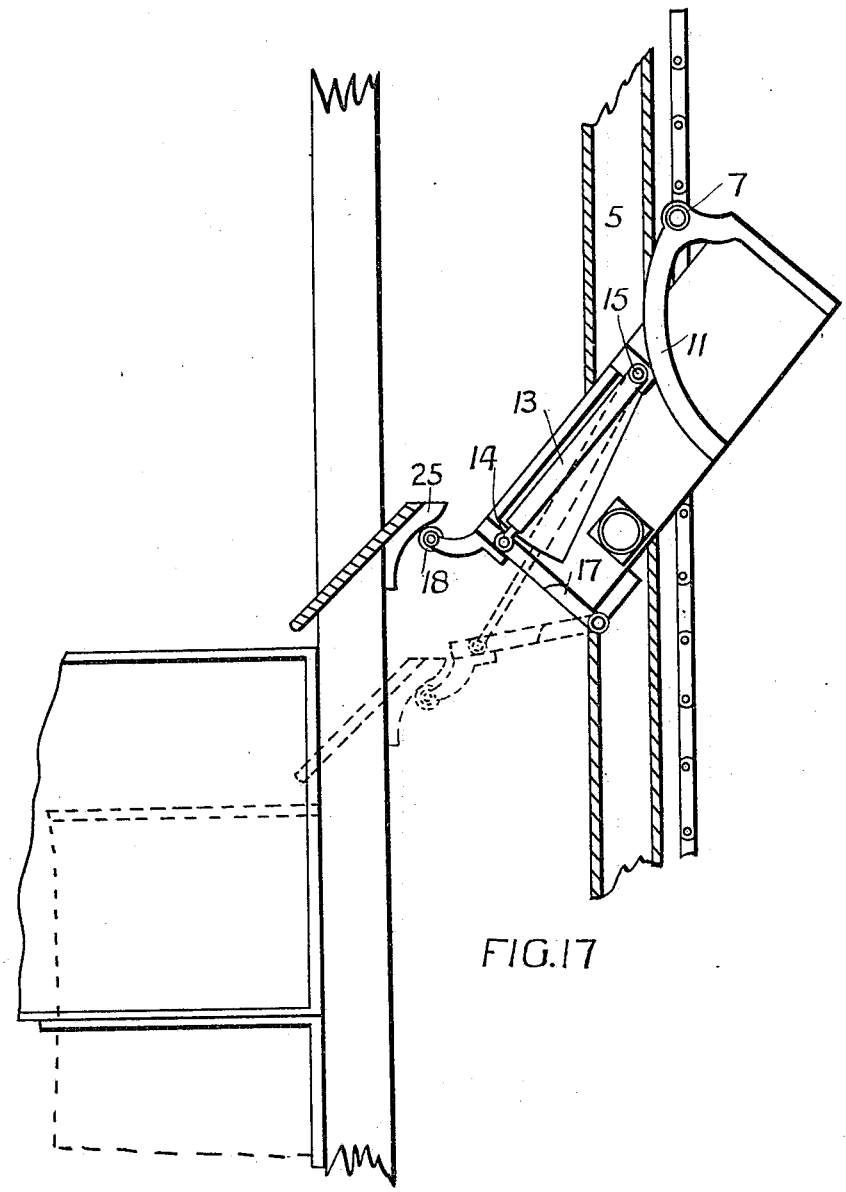

Referring to the annexed drawings, Figure 1 is a fragmentary skeleton view illustrating a portion of the framing of the housing and the position of the chain belt therein with one tray attached to it, and Fig. 2 is a front elevation corresponding thereto. Fig. 3 is an enlarged detail showing the bottom roller over which the chain belt runs and illustrating the mode of supporting the trays and the discharging-cam and the discharge-aperture. Fig. 4 is a similar sectional elevation taken at the upper roller or sprocket-carrier. Fig. 5 is a front sectional elevation, parts broken away, corresponding with Fig. 3. Fig. 6 is a horizontal section through the housing. Fig. 7 is a fragmentary front elevation, parts broken away, corresponding with Fig. 4. Figs. 8 to 11 illustrate the construction of the tray which I prefer to use in practice, and Figs. 12 to 17 alternative constructions of tray. Fig. 8 is a vertical section taken across the tray; Fig. 9, side elevation of the same; Fig. 10, vertical longitudinal section through the tray, and Fig. 11 a top plan of the same. Fig. 12 is a side elevation showing the tray closed; Fig. 13, sectional side elevation showing the same tipped to discharge; Fig. 14, top plan corresponding with Fig. 13; Fig. 15, fragmentary bottom plan corresponding with Fig. 14; Fig. 16, side elevation of tray with falling front end plate and non-tipping bottom, showing the falling front end partially opened; Fig. 17, sectioned side elevation explanatory of the operation of the tray-unloading device.

The driving is effected by an electric motor, for which any other source of power may be substituted. The motive power is shown in the upper part of the housing and marked 1. Speed is reduced by any suitable gear, so that the peripheral speed of the sprocket-wheels 2 and the speed of the belt will be suitable for working conditions, allowing due time for the insertion of loading into the trays while they are passing the apertures in the housing. There are two of these top support sprocket-wheels 2, which may be journaled upon overhung centers or mounted on a through-shaft running in plummer-blocks fixed on the framing. When the through-shaft is used, the diameter of the sprocket-wheels 2 must be sufficient to allow the trays to hang clear of the same when passing over the top center.

3 represents idle wheels, and 4 straining-gear of any convenient type, placed, preferably, at the foot of the chain-run for the purpose of taking up slack of the chain. By providing idlers to alter the lead of the chain belts the housing is reduced to minimum dimensions, while end sprockets of liberal size are used.

5 represents channel-rails, which may be made of wood, to receive the guide-lugs 6, set on the sides of the trays.

At appropriate distances apart along the length of the chain, carrying-links are inserted which are connected to the swinging lugs 7 on the trays. These swinging lugs are adapted to make contact with the outer part of the hollow guide 5, as will be seen on reference to Fig. 4, so that while the chain supports the weight the angular position of the box or tray will be controlled by the two sets of lugs, one bearing inside and the other bearing outside the guide. The angle at which the tray hangs will therefore not be varied by a difference in the loading, and the tray as a whole will not be tipped when the bottom plate is swung up (see Fig. 4) by contact of its tappet 8 with the cam-block 9.

10 is a dividing-partition in the housing. It forms a support for the cam-blocks 9, which are set at each floor in proper relation to the discharging-aperture in the housing, so as to operate on the trays to make the same discharge at the proper level and no sooner or later and having so discharged them to allow the moving parts to fall back into position gradually without noise. It serves also to divide the housing, thereby to prevent the upgoing and the downgoing trays from knocking. At the top end of this partition is a piece of leather belting 22, stretched taut, which forms a buffer against which the lips of the trays bear or rub as they swing in over the top idlers 3. The tray-lips are metal-shod where they touch this buffer. At the lower end the partition terminates in a guard-plate 24, which prevents the down-coming trays from fouling the through-shaft of the lower chain-rollers and the upgoing trays, as shown in Fig. 3.

To obtain adequate strength, the carrier or tray boxes may be metal-bound, (as shown in Figs. 8 to 11,) and where a bridge-piece 11 of this binding is made to pass across under the box it will be found necessary to make an aperture 12 in the tappet-plate, so as to allow the same to move with the tray-bottom, as indicated in Fig. 10. The back end of the box may be left open, as shown in Fig. 10, or it may be built up. The size and strength of the tray is settled according to the character of the work for which the conveyer is required. If required only for carrying matter such as can be placed in envelops, the whole construction may be light, and if it is required to convey goods whose weight runs up to, say, one hundredweight, a heavy and rigid construction is called for that it will not be injured under the heavier conditions of work. When required to handle only documents and matter in envelops, the materials are placed in leather pockets or cases during transit.

The positioning of the lugs 6 and 7 in relation to the tray and its load must always be such that when the bottom plate is tipped up, as shown in Fig. 10, the resting angle will not have been reached and the goods will be free to slide off said bottom plate.

Referring to Figs. 12 to 14, 13 is a tube, which, with the piston 14 running therein, forms a dash-pot. Its back end is pivotally attached at 15 to the side of the tray, and the forward end of the piston 14 is similarly pivotally attached to the falling-down end plate 17 of the tray. The operation of the dash-pot contrivance is to secure a cushioning of the slamming to of the end plate 17 when the roller-tappet 18 leaves the striker 25, by which it is depressed to discharge the tray. The end plate 17 is mounted on the frame of the tray by means of two or more hinges 19, and spring mechanism 20 is provided for normally holding the box closed. This spring mechanism consists of a coil-spring, which, operating either in tension or compression, tends to keep the end plate closed up to the tray-mouth. Attached to the end plate is a false bottom plate 21, which tips up with the bottom plate, so as to insure the effective discharge of the load by positively spilling the same out of the tray or box. This tipping bottom plate may be omitted, and in that case the load slides out of the tray and is not tipped out of it.

It is not necessary that the tappets on the trays should be at the centers thereof. They are set differently for each set, being put in the same relative position on all the trays designed to unload at any floor. The cam-blocks or strikers on the housing are placed to correspond, so that the tappets will pass all the cams and strikers until they arrive at the blocks specially set to operate them. By altering the positions of the tappets and cams or strikers the trays may be made to discharge at any level required.

The mode of operation is as follows: The parcel or packet is deposited in a tray marked with the name of the floor to which the load is consigned as such tray is passing the aperture at the housing in the sending-floor. The load so inserted is carried by the tray until upon coming to the aperture in the floor to which it is consigned the cam-piece of the striker coacts with the tappet on the tray, causing the tray to discharge the load by lifting up the bottom plate or by tipping down the end plate, whereby such load is discharged from the tray through the aperture in the housing into the basket or box set to receive it, or onto the floor, or onto a traveling band. The trays being flexibly supported from the two chains, which together form an endless carrying-belt, and said trays running clear of all the guide-wheels they are held by gravity always at the same angle of inclination to the plane of the horizon, and will not spill their contents when passing around either the head or foot wheels. Consequently a loaded tray can make the entire circuit of travel of the endless belt without spilling its contents unless the automatic dumping apparatus is called into play. Thus it is possible for my apparatus to serve not only as a means for carrying goods from a lower to a higher level, but also trays loaded at an upper level will carry their contents safely around the head-wheels, down the other side of the housing, around the foot-wheels, and up to the particular lower level at which they are set to discharge.

What I claim as my invention, and desire to secure by Letters Patent, is—

1. A vertical up-and-down conveyer for office and store service comprising an inclosed well or housing, head and foot sprockets therein carrying continuous chain belts, box-trays comprising end and bottom pieces carried on said belts and maintained in angular position thereon by runners working in guides, tappets on the trays and cams set to engage the tappets at delivery-levels and adapted to free the load from the tray by varying the relative positions of the end and bottom of the box-tray with reference to each other.

2. In a vertical conveyer the combination of a pair of chain belts running over head and foot wheels in a housing which has loading and discharging apertures at various levels, guides in the housing, a plurality of box-trays comprising hinged bottom pieces and fixed end pieces hung on said chain belts moving therewith and maintained by the guides at a fixed angle, tappets on said hinged bottoms, and fixed cam-blocks set to strike said tappets for the purpose of swinging the tray-bottoms above the fixed front end plates of said trays to discharge the load by gravity, substantially as described.

3. The combination of a housing having head and foot wheels journaled therein, a pair of chain belts running over said head and foot wheels, a plurality of trays comprising hinged bottom plates and fixed end pieces hung on said chain belts moving therewith and maintained at a fixed angle to the plane of the horizon at all points of travel, tappets on said hinged bottom plates, and fixed cam-blocks adapted to strike said tappets and lift the hinged plates to discharge the load from the tray.

4. In a conveyer of the kind herein described, trays which hang on the chain belt at an angle and which have bottom plates hinged at the upper back edges and fitted with tappets set to strike fixed cam-blocks whereby said bottom plates are raised to clear the ends of said trays thereby to allow the load in said trays to slide off the same at predetermined positions, substantially as described.

5. A tray for a conveyer operating as described having sides and front end and a bottom plate hinged at the edge, a tappet 8 on the under side thereof and coacting therewith a fixed cam-block 9, and lugs moving in guides whereby the tray is caused to hang in an angular position, substantially as described.

6. The herein-described carrier for an automatic discharge vertical conveyer, consisting of an inclined tray for carrying the load having a fixed front end and a bottom plate, said hinged bottom plate being adapted to be lifted sufficiently to allow the load to slide by gravity over the front end of the tray, substantially as described.

7. In a conveyer operating as described, a buffer at the top end of the partition dividing the housing, against which buffer the trays bear in passing over the idler, substantially as described.

8. In a conveyer of the class described, the means for maintaining the trays at a uniform angle consisting of grooved guide-rails, hanging lugs bearing against the outside of said guide-rails and side lugs moving in said guide-rails, substantially as described.

9. The combination of a vertical housing with loading and discharge apertures at various levels, head and foot driving and guide sprockets and wheels, endless chain belts running thereon and on idlers, tipping trays hanging on said chain belts, guides 5 and lugs and runners on the trays coacting therewith, buffer 22 and shield-plate 24, and cam-blocks for acting on the tray bottom plates to discharge load therefrom at predetermined levels respectively, substantially as described.

10. In a conveying apparatus adapted to deliver goods from the point of loading to both higher and lower levels, the combination of a housing extending to said various levels, an endless belt traveling up and down in said housing upon suitable guide-wheels which rotate always in the same direction, and a plurality of box-trays comprising end and bottom pieces flexibly hung to said belt and running clear of the guide-wheels, whereby said trays are held by gravity always at substantially the same angle to the plane of the horizon at all points of travel and may make the complete circuit of endless-belt travel without discharging their contents, together with adjustable means for discharging the contents of any particular tray at any desired level by varying the relative positions of the ends and bottoms of the trays.

11. In a conveying apparatus adapted to deliver goods from the point of loading to both higher and lower levels, the combination of a housing extending to said various levels, an endless belt traveling up and down in said housing upon suitable guide-wheels which rotate always in the same direction, and a plurality of box-trays comprising end and bottom pieces flexibly hung to said belt and running clear of the guide-wheels, whereby said trays are held by gravity always at substantially the same angle to the plane of the horizon at all points of travel and may make the complete circuit of endless-belt travel without discharging their contents, together with adjustable means for discharging the contents of any particular tray at any desired level, by varying the relative positions of the ends and bottoms of the trays said means comprising hinges for one of said parts, a tripping-arm connected to said hinged part, and a fixed cam located in the path of travel of said tripping-arm.

In testimony whereof I have signed my name to this specification in the presence of two subscribing witnesses.

WALTER HUSSEY GERMAN.

Witnesses:
N. RILEY,
W. J. DAVIS.